(12) United States Patent
Hellot et al.

(10) Patent No.: US 8,231,139 B2
(45) Date of Patent: Jul. 31, 2012

(54) AIRBAG

(75) Inventors: Laurent Hellot, La Feuillie (FR);
Damien Demulder, Beauvais (FR);
Marc Phillips, Burton upon trent (GB);
Mikolaj Niewodniczanski, Wroclaw (PL); Waldemar Jarosik, Wroclaw (PL)

(73) Assignee: Autoliv Development AB, Vargarda (SE)

( * ) Notice: Subject to any disclaimer, the term of this patent is extended or adjusted under 35 U.S.C. 154(b) by 126 days.

(21) Appl. No.: 12/596,588

(22) PCT Filed: Apr. 20, 2007

(86) PCT No.: PCT/SE2007/000383
§ 371 (c)(1),
(2), (4) Date: Apr. 21, 2010

(87) PCT Pub. No.: WO2008/130285
PCT Pub. Date: Oct. 30, 2008

(65) Prior Publication Data
US 2010/0230940 A1    Sep. 16, 2010

(51) Int. Cl.
*B60R 21/16* (2006.01)
(52) U.S. Cl. .................. 280/732; 280/743.1
(58) Field of Classification Search .......... 280/732, 280/743.1
See application file for complete search history.

(56) References Cited

U.S. PATENT DOCUMENTS

| 4,474,390 | A | 10/1984 | Scholz et al. | |
| 5,094,476 | A * | 3/1992 | Chihaya | 280/743.1 |
| 6,971,664 | B2 | 12/2005 | Amamori | |
| 7,201,397 | B2 * | 4/2007 | Keshavaraj | 280/743.1 |
| 7,954,850 | B2 * | 6/2011 | Fischer et al. | 280/743.1 |
| 2002/0005638 | A1 * | 1/2002 | Musiol et al. | 280/743.1 |
| 2003/0094794 | A1 | 5/2003 | Amamori | |
| 2005/0098984 | A1 | 5/2005 | Matsumura | |
| 2006/0043709 | A1 | 3/2006 | Asai et al. | |
| 2006/0214405 | A1 | 9/2006 | Rose et al. | |

FOREIGN PATENT DOCUMENTS

| DE | 3210043 A1 | 9/1983 |
| DE | 10355487 A1 | 7/2005 |
| EP | 1314616 A1 | 5/2003 |

* cited by examiner

*Primary Examiner* — Faye M. Fleming
(74) *Attorney, Agent, or Firm* — Harness, Dickey & Pierce, P.L.C.

(57) ABSTRACT

In an airbag arrangement for a front seat passenger in a motor vehicle, an airbag is mounted, in its stowed condition, in a dashboard of the vehicle. The airbag is configured to inflate to a deployed condition interposed between the dashboard and the front seat passenger. The inflated airbag is wider on an upper side, over an impact region nearer the front seat passenger, than on a lower side adjacent the dashboard. The airbag is narrower at an end adjacent the vehicle dashboard than at an end nearer to the front seat passenger.

20 Claims, 4 Drawing Sheets

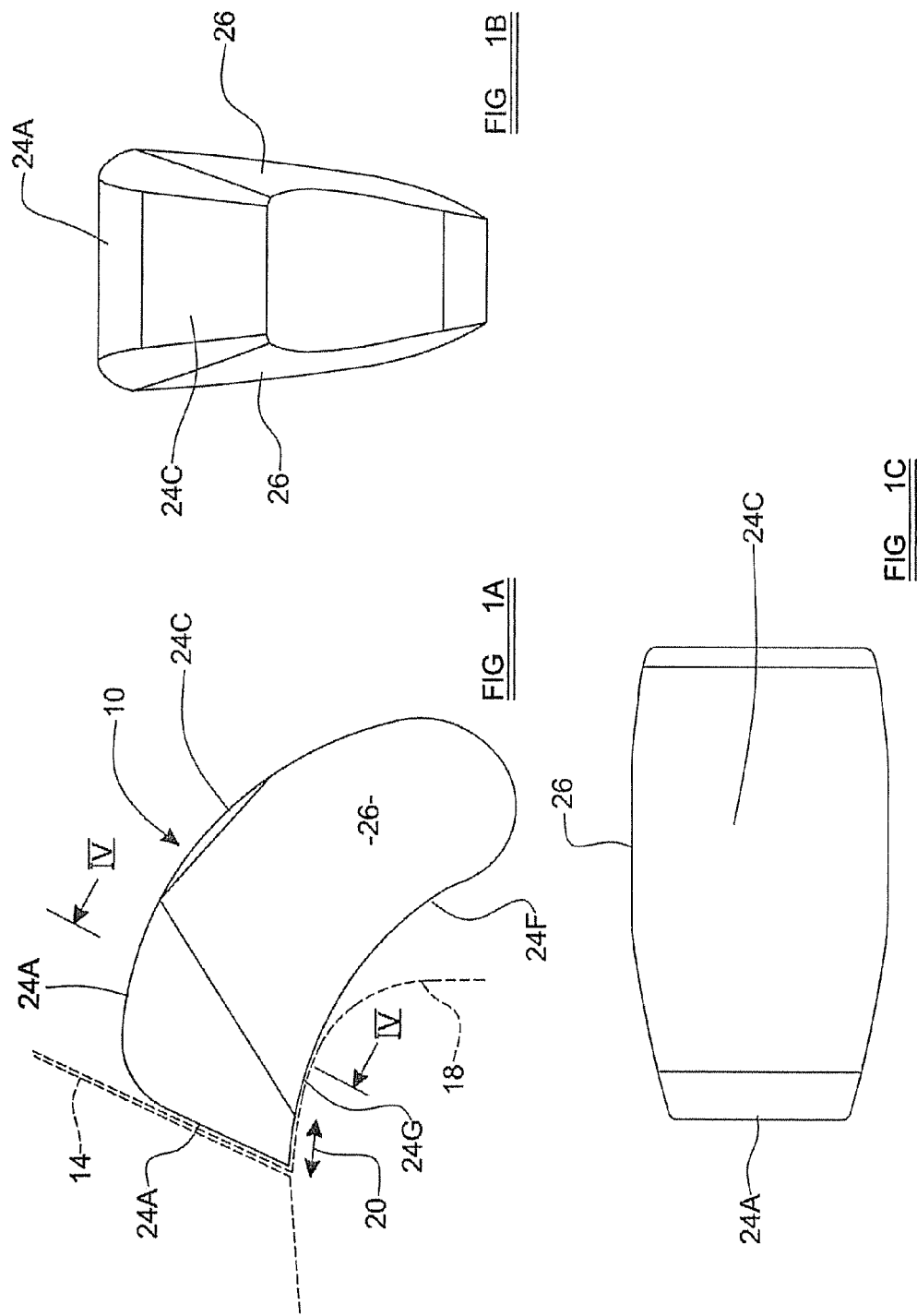

AIRBAG

CROSS-REFERENCE TO RELATED APPLICATIONS

This application is a National Stage of International Application No. PCT/SE2007/000383, filed Apr. 20, 2007. The entire disclosure of the above application is incorporated herein by reference.

FIELD

THIS INVENTION relates to so-called airbags of the kind used to protect occupants of motor vehicles from injury in crash situations.

BACKGROUND

Such an airbag is inflated rapidly in a crash situation, by means of a pyrotechnic gas generator or inflator, from a stowed condition in which the folded bag is contained in a compartment behind a displaceable interior panel of the vehicle, to a fully inflated condition in front of the vehicle occupant for which it is intended. The present invention relates particularly to a dashboard—mounted airbag for a front seat passenger of a motor vehicle. Such a passenger airbag normally must be significantly larger than a corresponding airbag for a driver of the vehicle, because a driver airbag is normally mounted in the hub of the steering wheel and thus much closer to the individual for which it is intended than the passenger airbag mounted in the dashboard. Such large airbags for front seat passengers of motor vehicles must accordingly have a volume significantly larger than that for driver airbags and require significantly more fabric and larger inflators which are relatively expensive and heavy.

SUMMARY

One object of the present invention is to provide, in a motor vehicle, a front seat passenger airbag of reduced volume as compared with known front seat passenger airbags, making it possible to use a smaller inflator, and possibly even an inflator of the same type as used for driver airbags.

According to the present invention there is provided an airbag arrangement for a front seat passenger in a motor vehicle, comprising an airbag mounted, in its stowed condition, in the dashboard of the vehicle, characterised in that the airbag is so configured that it its inflated, deployed condition in which it is interposed between, on the one hand, the dashboard and windscreen of the vehicle and, on the other hand, any occupant of the passenger front seat, the inflated bag is wider on its upper side, nearer such occupant, than on its lower side.

Preferably, the airbag is further so configured that, in its inflated deployed condition, the inflated bag is narrower at its end adjacent the vehicle dashboard than at its end nearer to the passenger front seat.

Preferably the airbag is so configured as to spread out its area of contact with the vehicle windscreen and dashboard upon impact of a front seat passenger with the bag.

DRAWINGS

An embodiment of the invention is described below, by way of example, with reference to the accompanying drawings in which:

FIGS. 1A, B and C are respectively a side elevation, a front elevation and a plan view from above of an airbag in accordance with the invention in its fully inflated, deployed state;

DETAILED DESCRIPTION

FIG. 1A shows a side view of a front seat passenger airbag 10 fully inflated and indicates, in broken lines, the windscreen 14 and dashboard 18 of a vehicle in which the airbag is installed. Over the region indicated at 20 the airbag is secured to an inflator (not shown), known per se, mounted within a cavity (not shown) in the dashboard, the airbag, in the stowed condition prior to use or deployment being also accommodated in that cavity under a panel, e.g. of light plastics, detachably fitted in the dashboard, again in a manner known per se. As will be appreciated from FIGS. 1A to 1C, the airbag in its inflated configuration is generally elongate in a fore and aft direction and, as viewed in the side views in FIG. 1A, the bag, as a whole, curves rearwardly and downwardly to follow the curvature of the dashboard, providing an upper surface which is convex in a fore and aft vertical plane and a lower surface which, in such plane, is concave for a major part of its length, from the forward end of the bag to adjacent the rear end of the bag.

Figure 2A:
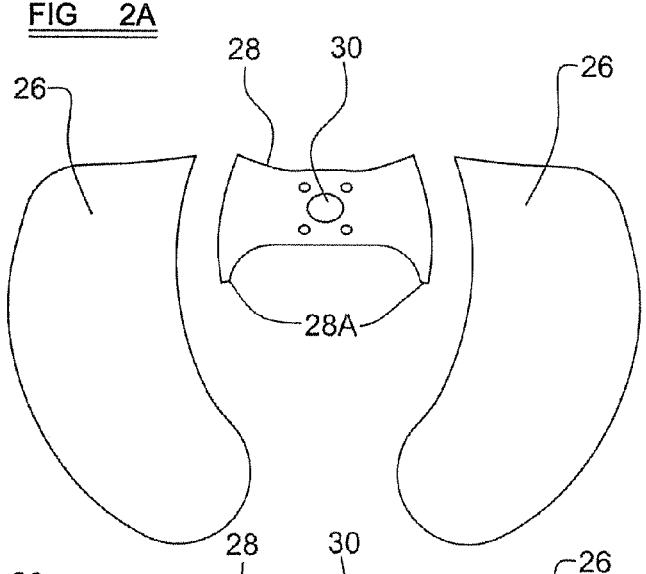
FIG. 2A is a view showing two fabric side panels and an inflator interface panel of the airbag.
Figure 2C:
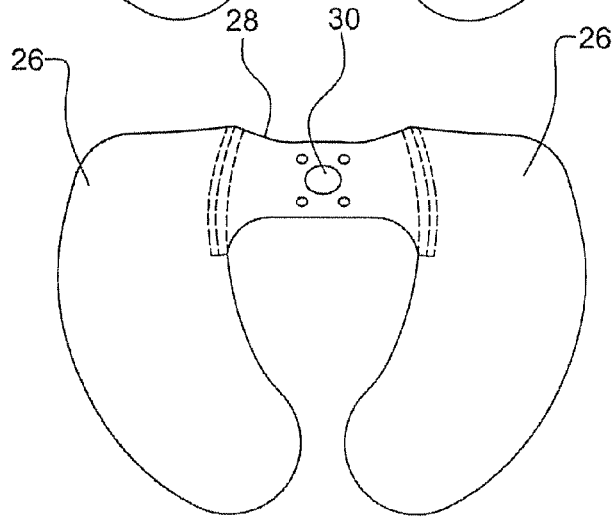
FIG. 2C shows the side panels of FIG. 2A stitched to the inflator interface panel of FIG. 2A.
Figure 2B:
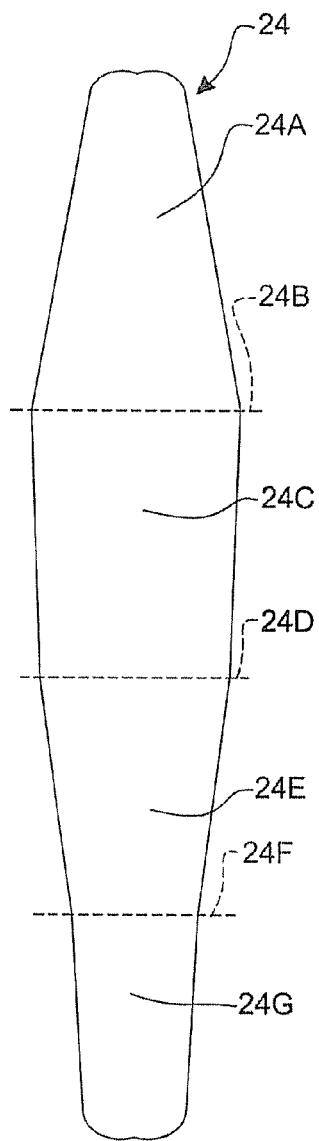
FIG. 2B shows a main panel of the airbag.

The airbag is formed from a plurality of initially flat fabric panels, comprising an elongate main panel 24 shown in FIG. 2B, two side panels 26 shown in FIG. 2A and an inflator interface panel 28, likewise shown in FIG. 2A. As shown in FIG. 2A, the side panels 26 are of generally uniform shape, corresponding to the shape of the inflated bag in side view (FIG. 1A). The inflator interface panel is a relatively small panel which is stitched at either end to the concave edges of the panels 26, arranged in mirror-image relationship as indicated in FIGS. 2A and 2C, at the forward regions of these concave edges, corresponding to the region 20 indicated in FIG. 1A. The interface panel 28 is preferably of reinforced construction for engagement with an inflator and has a central aperture 30 through which such inflator can pass gas into the bag to inflate the same.

The main panel 24 comprises a portion 24A extending from one end for approximately one third of the length of the panel and which increases progressively in width from its free end, at which it corresponds substantially in width to the width of the front edge of the inflator interface panel 28, to a maximum width at a location indicated by dotted line 24B in FIG. 2B, from which location the panel tapers gradually in width over a central region 24C, herein also referred to as the impact region since it is the region which will be engaged by the body of a front seat passenger in an impact situation. From a location indicated by broken line 24D at the end of the region 24C remote from portion 24A, the main panel, over a region 24E, tapers further, slightly more acutely, to a location 24F at which it is relatively narrow, the remainder 24G of the main panel having a substantially uniform width or tapering only very slightly towards its extreme end remote from portion 24A at which end the main panel corresponds in width with the rear edge of the inflator interface panel 28.

In assembly of the bag, after stitching the panel 28 to the side panels 26 as shown in FIG. 2C, the end edges of the portions 24A and 24G are respectively stitched to the front and rear edges of the panel 28 and the side edges of the panel 24 are stitched to the corresponding peripheral edges of the panels 26, the final relative positions of the respective parts of the panel 24 being as indicated in FIGS. 1A to 1C. As shown in FIGS. 2A and 2C, the front and rear edges of panel 28 are generally concave, to mate with the generally convex end edges of panel 24 and the rear edge of the panel 28 terminates in tab or gusset portions 28A tapering to respective narrow tails. The tab or gusset portions 28A facilitate sewing of the rounded ends of the end edge of portion 24G of the main panel to the panel 28 and the panel 26. These tabs or gusset portions avoid a stress concentration and hence location of weakness and potential rupture at the region where the panels 26, 28 and 24 meet, which weakness would otherwise result if these panels met at a sharp right-angled corner. It will be appreciated, of course, that the part of the bag provided by panels 26, 28 could be made in one piece as a single panel. However, more economical use of the bag fabric material, in volume production of such bags, is possible with the panels of the shape illustrated.

It will be understood from the above that the forward end of the airbag, as viewed in FIGS. 1A and 1B, diverges upwardly from the location of the panel 28 whilst the upper surface of the bag, provided by the rear portion of portion 24A and by the impact region 24C diverges rearwardly from the front of the bag to the broader impact region then narrows once more over the curved, rounded rear end of the bag and over the lower surface of the bag whereby the bag is wider on its upper surface than on its lower surface. Thus the inflated bag may be regarded as having, in vertical cross section a shape which is approximately that of an inverted triangle.

Tests have shown that the depth of the inflated airbag, from the impact region on the upper surface of the bag to the narrower portion on the under surface of the bag, should be at least 400 mm and that the transverse width of the inflated bag in the impact region should again be at least 400 mm. Likewise, tests have established that the length of the entire inflated airbag, from its front to its rear end is ideally approximately 750 mm.

As noted above, the inflated bag has a wide impact region on its upper side and a relatively narrower lower region, before the occupant of the passenger seat impacts with the airbag.

Figure 3B:
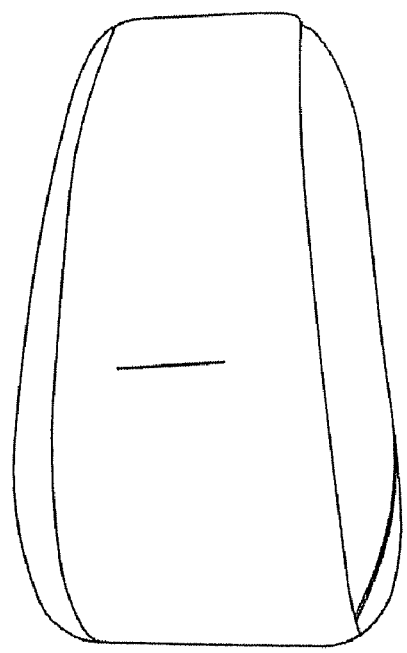
FIG. 3B is a plan view from above of the elements of FIG. 4A.
Figure 3A:
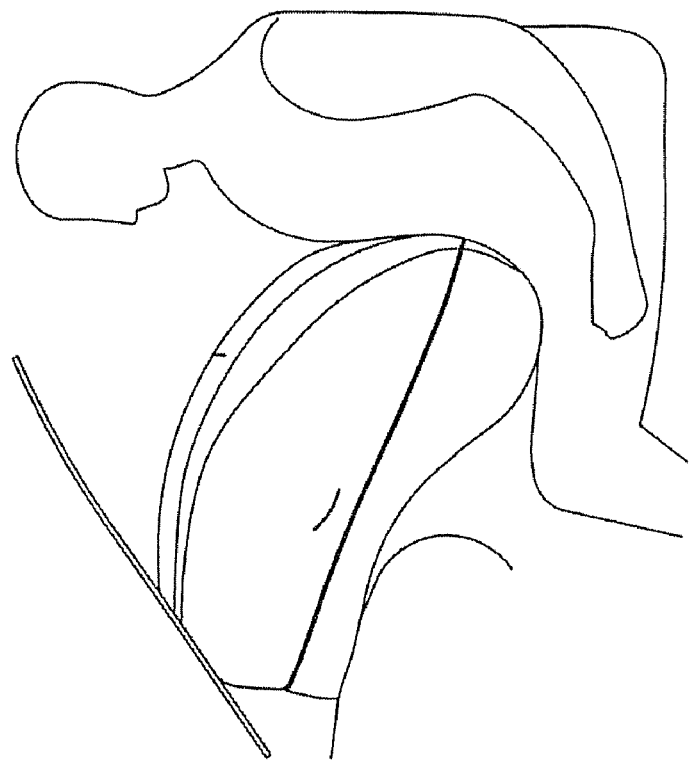
FIG. 3A is a side view showing the airbag in an inflated fully deployed condition in a test vehicle with a test dummy in position in the vehicle front passenger seat.

FIG. 3A shows a passenger in a front passenger seat in a motor vehicle, with the airbag 10 fully inflated. The condition illustrated corresponds to that which would obtain in a frontal crash situation at an instant just before the front seat passenger had begun to move forward appreciably relative to the vehicle. As shown, the rear end of the airbag lies in the passenger's lap and it will be understood that, in a crash situation, the passenger's head and torso will swing forwards and downwards so that the passenger's head will strike the airbag in the middle of the impact region 24C.

FIG. 3B shows that the inflated bag is wider at its end adjacent the passenger than at its forward end adjacent the dashboard and windscreen. When the bag is inflated, the front of the bag, provided by the portion 24A adjoining the panel 28, contacts the interior surface of the windscreen to enhance the stability of the bag.

Figure 4A:
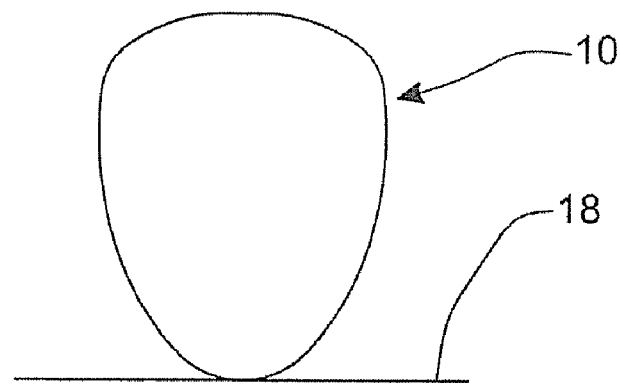
FIG. 4A is a diagrammatic view in vertical section on the line IV-IV in FIG. 1A, and, FIG. 4B is a view similar to FIG. 4A, but illustrating deformation of the airbag against the dashboard of the vehicle as the front seat passenger impacts the bag in a crash situation.

FIG. 4A is a somewhat diagrammatic view of the inflated airbag in cross-section along the line IV-IV in FIG. 1, namely through the impact region 24C and through a region of the underside of the airbag in contact with the dashboard 18. FIG. 4A illustrates how the inflated bag, before the passenger impacts it appreciably, has in such cross-section, approximately the form of an inverted triangle, with the upper surface, providing the impact region 24C, significantly wider than the lower surface of the bag. The bag may have internal straps serving to control the shape of the bag when inflated. The bag may also have safety vents or cinch tube vents (not shown) in accordance with normal practice in the art, for example controlled by straps or filaments within the bag.

Figure 4B:
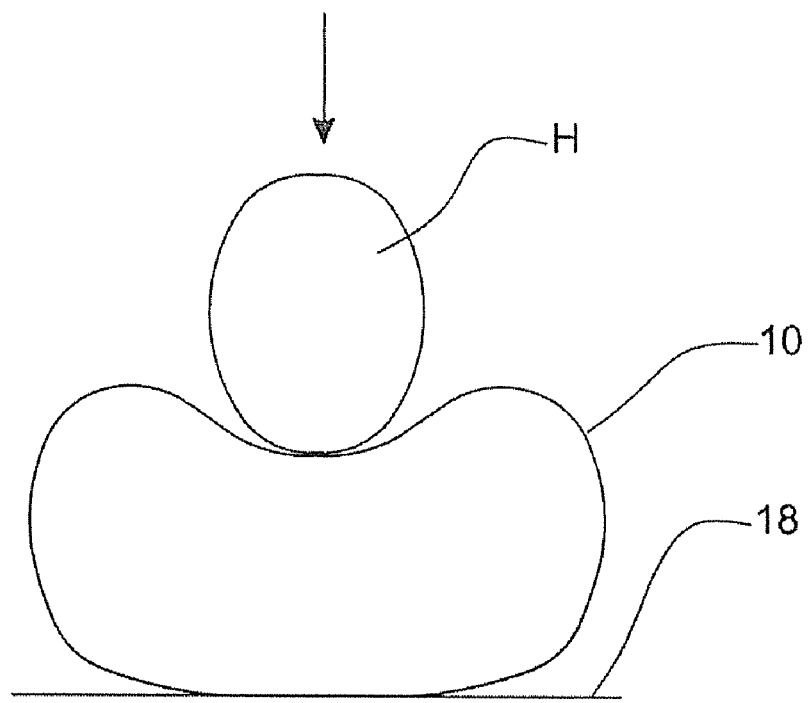

FIG. 4B is a schematic cross-sectional view corresponding to FIG. 4A, but showing the situation in which the passenger (the passenger's head is indicated at H in FIG. 4B) has impacted the inflated bag, so that the bag becomes compressed and the initially narrower lower region becomes spread out over a larger surface of the dashboard. Thus, the support surface by which the dashboard supports the inflated bag becomes enlarged as the seat occupant strikes the airbag. One effect of the above-noted spreading out of the bag on impact of the occupant is to provide particularly favourable energy absorption characteristics. Thus, whereas conventionally, a vent hole in the bag serves to allow the gas to discharge slowly from the bag, decelerating the seat occupant, in the arrangement described with reference to the drawings, the bag is first spread out or flattened against the dashboard and windscreen as the occupant pushes the bag towards the dashboard and windscreen, before the bag becomes fully compressed. When the bag, having first spread out as described, is compressed, the gas pressure within the bag rises and the gas is forced out through the vent holes.

As will be understood from the above, the bag is approximately of inverted triangular form in cross-section perpendicular to its direction of maximum elongation and this form of the bag provides a measure of slack or lost motion in the restraint to the occupant provided by the inflated bag. Thus, the major restraint applied to the seat occupant in a crash situation is delayed until the head and torso of the occupant have more fully engaged the bag. In effect, the occupant's head is permitted to move further than it would be with a conventional bag, so that there is no undesirable bending of the occupant's neck backwards as may occur with normal passenger airbags.

The invention claimed is:

1. An airbag arrangement for a front seat passenger in a motor vehicle, comprising an airbag mounted, in its stowed condition, in the dashboard of the vehicle, the airbag configured in an inflated, deployed condition in which it is interposed between a structure of the vehicle and an occupant of the passenger front seat, the inflated airbag is wider on its upper side, nearer such occupant, than on its lower side;

wherein the airbag is formed from a pair of side panels and an inflator interface panel, the inflator interface panel having a central aperture through which an inflator can pass gas into the airbag to inflate the airbag, and wherein the side panels are each stitched to the inflator interface panel; and wherein the airbag is configured to spread out to increase an area of contact with the structure of the vehicle upon impact of a front seat passenger with the airbag.

2. The airbag arrangement according to claim 1, wherein the airbag is so configured that, in its inflated deployed condition, the inflated airbag is narrower at a first end adjacent the structure of the vehicle than at a second end nearer to the passenger front seat.

3. The airbag arrangement according to claim 1, wherein the airbag, in its inflated state and absent any force applied thereto by an occupant of the passenger seat, is elongate in a fore and aft direction, namely in the direction from its connection with the structure of the vehicle towards the back of the front passenger seat.

4. The airbag arrangement according to claim 3, wherein the airbag in its inflated state and absent any force applied thereto by an occupant of the passenger seat, curves downwardly, presenting an upper surface which is convex in a fore and aft vertical plane and a lower surface which is concave in a fore and aft vertical plane.

5. The airbag arrangement according to claim 1, which is formed from a main panel providing upper and lower surfaces of the airbag when inflated and which increases in width from opposing end parts towards an intermediate region of maximum width and two opposing curved side panels of approximately kidney shape, respective longitudinal edges of the main panel being stitched to the peripheral edges of respective said side panels, and further wherein the interface panel connects the two side panels and to opposite ends of the interface panel are stitched the ends of the main panel.

6. The airbag arrangement according to claim 1, further comprising a main panel at least partially defining an upper surface and a lower surface of the airbag, the main panel secured along a length of the main panel to both of the side panels.

7. The airbag arrangement according to claim 6, wherein the main panel includes a first end secured to the interface panel.

8. The airbag arrangement according to claim 6, wherein the main panel includes a first end and a second end secured to the interface panel.

9. The airbag arrangement according to claim 6, the main panel including a first central portion defining the upper surface of the airbag upon inflation and a second central portion defining the lower surface of the airbag upon inflation, the first central portion having a greater area than the second central portion.

10. The airbag arrangement according to claim 6, wherein the airbag is defined by a plurality of independent panels consisting of the inflator interface panel, the pair of side panels and the main panel.

11. An airbag for a front seat passenger in a motor vehicle comprising:
   an inflator interface panel at a front end thereof, the interface panel defining an aperture through which an inflation gas can enter the airbag;
   a pair of side panels stitched to the inflator interface panel; and
   a main panel including a first end and a second end both secured to the interface panel, the main panel further including a first central portion defining an upper surface of the airbag and a second central portion defining a lower surface of the airbag;
   wherein the main panel and the first and second side panels cooperate to define the airbag to include a cross section in a lateral direction that is generally shaped as an inverted triangle.

12. The airbag arrangement according to claim 11, wherein the airbag is narrower at a forward end thereof than at a rear end thereof upon inflation.

13. The airbag arrangement according to claim 11, wherein the airbag is mountable within the vehicle relative to a structure of the vehicle and configured to spread out to increase an area of contact with the structure of the vehicle upon impact of a passenger with the airbag.

14. The airbag arrangement according to claim 11, wherein the main panel includes a first end portion proximate the first end, the first end portion having a width that increases from the first end to the first central portion.

15. The airbag arrangement according to claim 11, wherein the main panel further includes a second end portion proximate the second end, the second end portion having a width that increases from the second end to the second central portion.

16. The airbag arrangement according to claim 10, wherein the upper and lower surfaces of the airbag diverge in a rearward direction.

17. The airbag arrangement according to claim 10, wherein the airbag is wider on the upper surface as compared to the lower surface.

18. The airbag arrangement according to claim 10, wherein the airbag is defined by a plurality of independent panels consisting of the inflator interface panel, the pair of side panels and the main panel.

19. An airbag for a front seat passenger in a motor vehicle comprising:
   an inflator interface panel at a front end of the airbag, the interface panel defining an aperture through which an inflation gas can enter the airbag;
   a pair of side panels stitched to the inflator interface panel at lateral sides of the inflator interface panel; and
   a main panel including a first end and a second end both directly secured to the interface panel, the main panel also secured to both of the side panels along a length of the main panel, the main panel further including a first central portion at least partially defining an upper surface of the airbag and a second central portion defining a lower surface of the airbag, the main panel increasing in width along at least a portion of a length of the main panel proximate both the first and second ends;
   wherein the main panel and the first and second side panels cooperate to define the airbag to include a cross section in a lateral direction that is generally shaped as an inverted triangle.

20. The airbag arrangement according to claim 19, wherein the airbag is defined by a plurality of independent panels consisting of the inflator interface panel, the pair of side panels and the main panel.

* * * * *